UNITED STATES PATENT OFFICE.

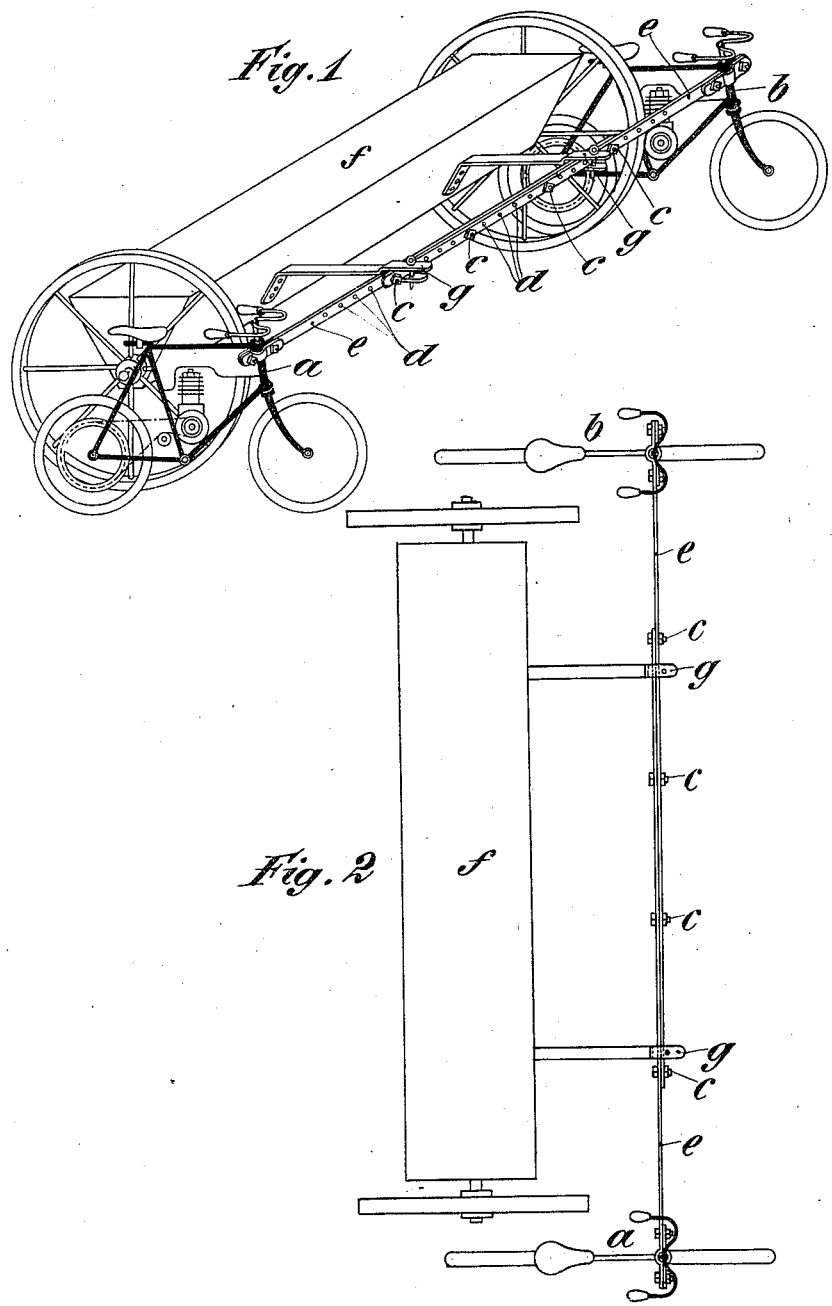

ALEXANDER JESZENSZKY, OF NOGRÁDKÖVESD, AUSTRIA-HUNGARY.

DEVICE FOR DRIVING MOTOR AGRICULTURAL MACHINES.

947,444.          Specification of Letters Patent.      Patented Jan. 25, 1910.

Application filed March 15, 1909. Serial No. 483,667.

*To all whom it may concern:*

Be it known that I, ALEXANDER JESZENSZKY, a subject of the King of Hungary, residing at Nográdkövesd, Austria-Hungary, have invented certain new and useful Improvements in Devices for Driving Motor Agricultural Machines, such as Harrows, Rollers, Sowing and Reaping Machines, and the Like, of which the following is a specification.

The present invention relates to a device for driving motor agricultural machines, such as harrows, rollers, sowing and reaping-machines and the like and the object of the invention is, on the one hand, to increase the breadth and thereby the efficiency of such agricultural machines, and, on the other hand, to do away with the draft cattle. Both said objects are of great importance considering the present state of agriculture, the difficulties to obtain land laborers and the continuous increase of working expenses which all necessitate the immediate utilization of favorable weather which however is only possible with machines of very great efficiency. On the other hand, the remunerative utilization of fruit-culture requires cattle-culture, so that any improvement which permits to reduce the draft cattle increases the number of useful cattle and consequently the rentability of the farm-yard.

Agricultural machines are used only periodically and for a short time, so that, if the motor were combined with the machine, the cost of construction would be unnecessarily augmented. The motorcars put before the machines for dragging the same along are very heavy and therefore very unpractical. For these reasons the driving of agricultural machines by motors has not been adopted with the exception of the steam-plow and the standard locomobiles for threshing-machines.

The present invention does away with all the above mentioned inconveniences as the motors used for driving agricultural machines are light motorcycles which are disposed at both sides of the machine and coupled with the same so that they can be easily uncoupled. The motorcycles which are arranged at the sides of the machine do not damage the fruit nor beat down the loose soil and they can further be used at any time and with any agricultural machine whatsoever.

The invention therefore consists therein that with the agricultural machine one or two motorcycles are laterally connected by any suitable means so that the machine can be run at much greater speed than machines driven by cattle, wherefrom results a considerable increase in the efficiency of the machines.

The coupling of the motorcycles with the machine can be effected in various manners; for example, the frames of the cycles can be coupled with the frame of the agricultural machine or the frames of the motorcycles can be coupled with the driving shaft of the machine or the driving shaft of the cycles may be coupled with the driving shaft of the machine, it being absolutely immaterial for the feature of the present invention in what manner the coupling of the machine and the motorcycles be effected. It is however essential that the coupling device can be easily removed and that the motorcycles be arranged at the side, either at one or at both sides, of the machine.

Instead of motorcycles light motorcars could be used. The same arrangement can be used for driving street-cleansing-machines and water-carts.

In the accompanying drawings the preferred form of the invention is shown.

Figure 1 is an axial projection representing a sowing machine with the driving engines. Fig. 2 is a diagram in ground plan.

The two motorcycles *a* and *b* are connected the one with the other by means of rods *e* which are fixed each with one end to the frame of its motorcycle. Said rods *e* have a certain number of holes *d* destined to receive the screw-bolts *c* with their nuts which serve to adjustably fix the free end of one rod *e* upon the free end of the other rod. The machine to be driven, in the example shown a sowing machine *f*, is coupled with the rods *e* by means of arms *g* which have fork shaped front ends so as to embrace said rods upon which they are fixed in any suitable and convenient manner.

I claim:—

An improved device for driving agricultural machines such as harrows, rollers, sowing- and reaping-machines and the like comprising in combination with the agricultural machine to be driven, two motorcycles, one at each end of said machine, a rod fixed with one end on the frame of the one motorcycle and having a certain number of holes and a rod fixed with one end on the frame of the other motorcycle and having a certain number of holes, screw bolts and nuts for adjustably connecting the free ends of said rods and forkshaped arms projecting from the front side of the agricultural machine to be fixed upon said rods connecting said motorcycles, substantially as described and shown and for the purpose set forth.

In witness whereof I have hereunto set my hand in the presence of two witnesses.

ALEXANDER JESZENSZKY.

Witnesses:
  MARTIN HOENIGER,
  JOSEF HELLER.